US010859263B2

(12) United States Patent
    Bartolo

(10) Patent No.: US 10,859,263 B2
(45) Date of Patent: Dec. 8, 2020

(54) METHOD AND APPARATUS FOR GAS DESTRUCTION

(71) Applicant: E I M Research Pty Ltd, Port Adelaide (AU)

(72) Inventor: Kevin R. Bartolo, North Haven (AU)

(73) Assignee: E I M Research Pty Ltd

( * ) Notice: Subject to any disclaimer, the term of this patent is extended or adjusted under 35 U.S.C. 154(b) by 0 days.

(21) Appl. No.: 16/480,573

(22) PCT Filed: Feb. 8, 2018

(86) PCT No.: PCT/AU2018/050093
    § 371 (c)(1),
    (2) Date: Jul. 24, 2019

(87) PCT Pub. No.: WO2018/145156
    PCT Pub. Date: Aug. 16, 2018

(65) Prior Publication Data
    US 2019/0360689 A1    Nov. 28, 2019

(30) Foreign Application Priority Data
    Feb. 10, 2017    (AU) .................................. 2017900428

(51) Int. Cl.
    *F02B 63/00*    (2006.01)
    *F23G 7/06*    (2006.01)
    (Continued)

(52) U.S. Cl.
    CPC ......... *F23G 7/065* (2013.01); *B01D 53/1493* (2013.01); *F01N 3/08* (2013.01);
    (Continued)

(58) Field of Classification Search
    CPC ....... Y02T 10/32; Y02T 10/36; Y02T 10/121; F02D 19/0642; F02D 41/0025; B01D 53/72; B01D 2258/0291
    (Continued)

(56) References Cited

U.S. PATENT DOCUMENTS 4,108,113 A  *  8/1978  Timm ..................... F02B 43/08
                                                              123/3
4,400,936 A       8/1983  Evans
(Continued)

OTHER PUBLICATIONS

International Search Report and Written Opinion for International Application No. PCT/AU2018/050093 dated Apr. 10, 2018.

*Primary Examiner* — Long T Tran
*Assistant Examiner* — James J Kim
(74) *Attorney, Agent, or Firm* — Foley Hoag LLP

(57) ABSTRACT

A method for the destruction of a target gas, the method including: a) compressing at a first pressure a mixture of air and target gas to produce a compressed target gas mixture; b) destroying the target gas by combusting the compressed target gas mixture with diesel fuel in a forced-induction internal combustion engine, at a combustion pressure greater than the first pressure in the turbocharger, to produce an oxidised exhaust gas, the combustion occurring while maintaining a load on the diesel engine with a load bank; and c) processing the oxidised exhaust gas to produce a vent gas for venting to atmosphere where the vent gas includes substantially no target gas.

23 Claims, 1 Drawing Sheet

(51) Int. Cl.
*B01D 53/14* (2006.01)
*F01N 3/08* (2006.01)
*F02D 19/06* (2006.01)
*F23G 5/12* (2006.01)

(52) U.S. Cl.
CPC .......... *F02D 19/0642* (2013.01); *F23G 5/12* (2013.01); *B01D 2252/103* (2013.01); *F23G 2209/14* (2013.01)

(58) Field of Classification Search
USPC .......................................................... 123/2
See application file for complete search history.

(56) References Cited

U.S. PATENT DOCUMENTS

| | | | |
|---|---|---|---|
| 4,681,072 A * | 7/1987 | Pouring | F02B 43/00 588/316 |
| 5,501,185 A | 3/1996 | King et al. | |
| 5,601,790 A * | 2/1997 | Stilger | B01D 53/72 422/168 |
| 5,692,458 A * | 12/1997 | Green | F23G 5/46 123/2 |
| 6,150,580 A * | 11/2000 | Janikowski | A62D 3/20 588/316 |
| 6,378,308 B1 | 4/2002 | Pfluger | |
| 2007/0214789 A1 | 9/2007 | Stiermann | |
| 2012/0292992 A1 | 11/2012 | Williams | |
| 2013/0174800 A1 | 7/2013 | Malm | |

* cited by examiner

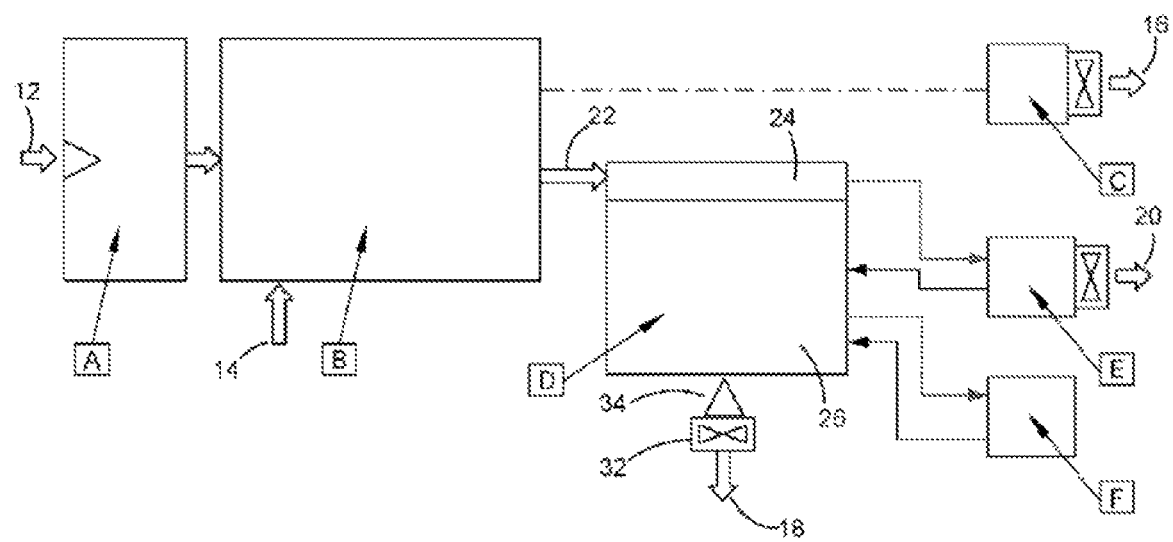

METHOD AND APPARATUS FOR GAS DESTRUCTION

RELATED APPLICATIONS

This application is the U.S. national phase of International Patent Application No. PCT/AU2018/050093, filed Feb. 8, 2018, which claims the benefit of priority to AU Patent Application No. 2017900428 filed Feb. 10, 2017. The specification of the International Patent Application is hereby incorporated by reference herein in its entirety.

TECHNICAL FIELD OF INVENTION

The present invention relates to the destruction of harmful or undesirable gases, which might otherwise be vented to atmosphere, these gases being referred to as "target" gases. A particular example of a target gas is a fumigant that has been used to fumigate freight containers and railcars (or other buildings and structures that might require fumigation), such as methyl bromide, sulfuryl fluoride and phosphine.

In this respect, the development of the present invention has arisen from work into the destruction of the target gas methyl bromide, therefore much of the following description will only refer to methyl bromide as the target gas for destruction. However, the invention is not to be so limited.

BACKGROUND OF INVENTION

Methyl bromide ($CH_3Br$, also known as bromomethane) has been used very successfully as a pesticide and fumigant for many years. However, at one time it was estimated that up to 80% of the methyl bromide applied for these uses was being emitted into the air, and by the early 1990's methyl bromide was recognised to be a significant contributor to stratospheric ozone depletion. Accordingly, most Governments moved to reduce the use of methyl bromide, even though it was still regarded as being an extremely effective fumigant (with few peers), and by the 2000's several countries had banned its use or had introduced very strict emission, recovery and/or destruction requirements where methyl bromide continued to be used.

Accordingly, efforts have been made to develop techniques for recycling or recovering methyl bromide applied during fumigation processes, often with the aim of decomposing or destroying the methyl bromide after fumigation. For example, U.S. Pat. No. 5,505,908 suggests recovering and recycling methyl bromide by adsorption on a molecular sieve and then desorption with hot gas, while U.S. Pat. No. 5,904,909 describes recovering and decomposing methyl bromide by contacting methyl bromide with an activated carbon, which is subsequently contacted with thiosulphate and water to decompose the methyl bromide into decomposition products.

Additionally, U.S. Pat. No. 7,311,743 has proposed the use of methyl bromide-degrading microorganisms in a biofiltration apparatus, while Japanese patent 7461329 suggests incinerating methyl bromide at high temperatures (600° C. to 1,000° C.) and then treating with sodium hydroxide solution to neutralize the produced hydrogen bromide.

Subsequently, it is instructive to note comments in the more recent U.S. Pat. Nos. 8,585,981 and 9,497,955, both describing apparatus for fumigating shipping containers and the like, both still utilising methyl bromide, and thus both needing to incorporate techniques for recycling or recovering the methyl bromide used by their apparatus.

In this respect, U.S. Pat. No. 8,585,981 describes the use of activated carbon to absorb the methyl bromide, with the activated carbon then being scrubbed with sodium thiosulphate, with or without further processing (such as incineration) of the activated carbon after scrubbing. However, a chemical oxidation process is suggested as an alternative, where the methyl bromide is bubbled through water with ozone gas or sodium hydroxide.

In U.S. Pat. No. 9,497,955, the use of a fumigant scrubber is described where methyl bromide is neutralized/destroyed by chemical reaction, such as a nucleophilic substitution reaction, as is the use of a carbon-based capture system that again uses activated carbon to absorb the methyl bromide.

An aim of the present invention is to provide an alternative method and apparatus for the destruction of harmful or undesirable target gases such as methyl bromide.

SUMMARY OF INVENTION

As foreshadowed above, the invention finds use in relation to the destruction of any harmful or undesirable target gas (not just methyl bromide) that can be oxidised in the combustion phase of an internal combustion engine, and so also relates to the destruction of any target gas that can be combined with sufficient air to form an oxidisable mixture.

With this in mind, the present invention provides a method for the destruction of a non-combustible target gas, the method including: a) compressing at a first pressure a mixture of air and target gas to produce a compressed target gas mixture, wherein the target gas concentration in the mixture of air and target gas is kept below about 40 $g/m^3$; b) destroying the target gas by combusting the compressed target gas mixture with fuel in a forced-induction internal combustion engine, at a combustion pressure greater than the first pressure, to thermally decompose the target gas and produce an oxidised exhaust gas, the combustion occurring while maintaining a load on the engine with a load bank; and c) processing the oxidised exhaust gas to produce a vent gas for venting to atmosphere where the vent gas includes substantially no target gas.

The present invention also provides a method for the destruction of a non-combustible target gas, the method including: a) continuously controlling the ratio of atmospheric air to target gas to maintain the target gas concentration in a target gas mixture below about 40 $g/m^3$; b) compressing at a first pressure the target gas mixture to produce a compressed target gas mixture; c) destroying the target gas by combusting the target gas mixture with fuel in a forced-induction internal combustion engine, at a combustion pressure greater than the first pressure, to thermally decompose the target gas and produce an oxidised exhaust gas, the combustion occurring while maintaining a load on the engine with a load bank; and d) processing the oxidised exhaust gas to produce a vent gas for venting to atmosphere where the vent gas includes substantially no target gas.

The internal combustion engine may be any type of internal combustion engine, including intermittent combustion engines such as four-stroke and two-stroke piston engines and Wankel rotary engines, and including continuous combustion engines such as gas turbines, jet engines and many rocket engines. The engines may be fed with fossil fuels such as natural gas, petroleum products (petrol, diesel or fuel oil), or renewable fuels such as biodiesel. In a preferred form, the internal combustion engine is a diesel-cycle internal combustion engine, and much of the following general description will relate to such an embodiment.

The load bank may be any usual form of load bank that provides a suitable load to an internal combustion engine, to assist in the prevention of things like incomplete combustion of the fuel, condensation formation within the engine, cylinder bore glazing, and to assist in raising combustion temperatures via increased fuel/air mixture volumes in the combustion chamber. The load may be any of an electrical load, a pneumatic load or a hydraulic load, but will preferably be an electrical load.

The use of an electrical load bank with the preferred diesel-cycle internal combustion engine is particularly advantageous in that it can be programmed via an electronic control system to apply a constant 75 to 80% work load to a diesel engine irrespective of any other constant or intermittent loads that may be applied via other electrical components of the system. These increased engine loadings in a diesel engine prevent cylinder glazing, which prevents the piston rings from sealing adequately against the cylinder bore walls to the detriment of cylinder compression pressures, fuel and oil consumption rates, and leads to an overall decrease in engine performance.

Heat generated by the load bank may be used to facilitate gas fumigant desorption where the target gas is a fumigant that is being destroyed after use in a fumigation process. For example, in this latter form, the heat generated by the load bank may be used to raise the ambient air temperature in a fumigated space to allow a more rapid desorption of the fumigant from the fumigated product, such as by passing atmospheric air through the load bank prior to it entering that space. Such a heated gas can be ducted directly from the load bank to the space being fumigated via fixed or flexible tubing.

In this respect, the target gas to be destroyed by the method and apparatus of the present invention is most likely to be sourced from a fumigation process. Thus, the target gas may be such as methyl bromide, phosphine or sulfuryl fluoride. In any form, pre-filtration systems may also be provided, prior to or after the mixing of the target gas with air, in order to remove undesirable coarse particles or excess moisture from the target gas and/or the target gas mixture before compression. Also, fixed atmospheric and target gas sensors may be provided in the gas flow before compression in order to constantly measure the respective incoming gas concentrations and relay data to measurement devices and other process control systems as necessary, including control valves and mixers for adjusting flow rates and ratios of target gas to atmospheric air. This assists with ensuring optimum mix ratios are maintained with preferred operational specifications.

More specifically in relation to these optimum mix ratios, target gas is mixed with atmospheric air prior to compression at the first pressure mentioned above to ensure, amongst other things, appropriate levels of oxygen are present for the subsequent combustion. In a preferred form, the target gas concentration in the target gas mixture will be kept below about 40 g/m$^3$, or below about 35 g/m$^3$, or below about 30 g/m$^3$, or below about 25 g/m$^3$, or below about 20 g/m$^3$. This mixing preferably occurs as an in-line process in a target gas mixer and is controlled by a process control system that controls the ratio of target gas to air to form the desired target gas mixture. In this respect, the target gas mixer control system will preferably also be able to monitor the concentration and composition of the incoming target gas to assist with, for example, levelling any concentration peaks that might otherwise cause a problem in the following combustion and processing stages.

The mixture of the target gas and air is ideally compressed to a first pressure of between about 16.0 and 18.0 psi under normal operating and load conditions to produce the compressed target gas mixture.

This compressed mixture of target gas and air is introduced to the cylinder of the diesel engine, preferably via forced induction brought about by positive pressures generated by a turbocharger or supercharger or the like, and subsequently undergoes pre-combustion compression in the combustion chamber of the engine to a second pressure within the range of 25 to 35 atm, raising the temperature of the air/target gas mixture to at least 550° C. This second pre-combustion compression pressure in the combustion chamber commences the thermal decay process of the target gas mixture, by raising the temperature to be above the thermal decay temperature of the target gas, extending the time necessary to achieve thermal destruction and assisting with the efficiency of the combustion process in the following stage. It also adds to the overall efficiency and efficacy of the destruction of the target gas.

The compressed target gas mixture is then ideally combusted with the injection of fuel into the combustion chamber of the engine (preferably diesel fuel in a diesel engine) at a pressure (the combustion pressure) higher than the pressure in the pre-combustion compression (the second pressure) to produce the oxidised exhaust gas. Preferably, the target gas mixture is combusted in the combustion chamber of the engine at a combustion pressure within the range of 50 to 65 atm.

In one form, this combustion process results in flame temperatures in the combustion chamber reaching between about 2,600 to 2,700° C., with combustion chamber temperatures preferably reaching the range of 600 to 700° C., continuing the thermal decay of the target gas mixture and giving rise to destruction values of about 97% being achievable (preferably above about 99%, more preferably above 99.99% and most preferably 100%) with a single compression/combustion cycle.

It will be appreciated that the oxidation reactions in the combustion chamber result in the conversion of the harmful or undesirable compounds in the target gas mixture into other compounds, leaving only a very small amount of the originally undesirable target gas, especially with destruction levels above 99%. Depending upon the target gas, the combustion converts the harmful or undesirable compounds into gases containing hydrogen and the base element of the chemical that was destroyed, such as the bromine in methyl bromide forming hydrogen bromide, and the fluorine from sulphuryl fluoride forming hydrogen fluoride. Water vapour and carbon dioxide are also formed.

Under these preferred operating conditions, air is forced into the combustion chamber of the engine which, when compressed and with the addition of the fuel, ignites and burns much more ferociously than in standard atmospheric or non-forced air induction type engines, ensuring that higher gas temperatures and combustion pressures are maintained for a longer period of time than is possible in either normal atmospheric incineration (1 atm) or a conventional non-forced induction engine. The effect of pressure on the combustion process is such that a doubling of the pressure under which incineration occurs, doubles the chemical reaction rate. Preferably this reaction occurs at a range of combustion pressures between 50 and 65 atm which would lead to destruction times 50 to 60 times less than the 0.75 seconds residence time required for a 600° C. incineration of methyl bromide (or other target gases) at the normal atmospheric pressure of 1 atm.

Furthermore, maintaining a minimum 75 to 80% load on the engine via a load bank ensures that constantly high engine combustion temperatures and pressures are created and maintained throughout the target gas destruction process. The more load an engine is exposed to, the more fuel is required to maintain a constant level of revolutions (which in the preferred form with the diesel engine would be governed to 1500 or 1800 revolutions per minute dependent upon the chosen electrical frequency of the alternator of the diesel engine) and the higher the resultant combustion temperature and pressure.

This combination of high temperature and pressure exceeds known destruction parameters for such target gases and, in combination with pressure reduced residence times as described above, gives rise to destruction values being achieved that are above about 97% (and preferably above about 99% and more preferably above about 99.99%, and most preferably 100%) within a single compression/combustion cycle, leaving very little target gas to be processed (eliminated) by any scrubbing system that follows the destruction cycle.

In a preferred form, the (hot) oxidised exhaust gases preferably exit the engine through a turbocharger, which in turn drive the turbine in the induction side of the turbocharger, and then exit the turbocharger at a lower temperature (preferably below about 570° C.).

In one form of the method, the oxidised exhaust gases exiting the engine (or a turbocharger where the exhaust gases are passed through that) may be cooled to a temperature below 100° C. prior to further processing in order to avoid excessive evaporation during that further processing, while maintaining the temperature above the condensation point of the gases to avoid the formation of undesirable acids in the processing equipment and lines. If such cooling is utilised, the cooling of the exhaust gases may be effected by the use of a thermostatically operated cooling fan to increase airflow over the exhaust piping, with the exhaust piping being either smooth or finned piping.

The processing of the oxidised exhaust gases may include both a wet scrubbing stage and a desalination stage. The wet scrubbing stage ideally utilises a plurality of water-based scrubbers, together with a cooling system designed to maintain the scrubbing solution to an optimum temperature of between about 50° C. and 60° C. in order to minimise evaporation and maximise the chemical reaction rates occurring during scrubbing. In this respect, during scrubbing, and on contact with the water, the incoming oxidised exhaust gases are converted into acid forms of the base gas, which will include not only the target gases, such as hydrogen bromide forming hydrobromic acid, and hydrogen fluoride forming hydrofluoric acid, but also carbon dioxide gas forming carbonic acid. These acids form a part of the scrubbing solution.

These acids are then preferably substantially neutralised with an acid-base reaction by passing the scrubbing solution through an aggregate bed containing marble chips of calcium carbonate ($CaCO_3$) which then selectively reacts with the target acids to form salts of the target acids. Having said that, it will be appreciated that carbonic acid does not react significantly with $CaCO_3$, and largely remains unaffected by this process. Typical salts formed would be calcium bromide (from hydrobromic acid) and calcium fluoride (from hydroflouric acid), and the like.

Carbon dioxide absorption into the scrubbing solution preferably continues until such time as the scrubbing solution becomes saturated. After this point, all carbon dioxide entering the scrubbers will ideally simply pass through to be vented to atmosphere with the vent gases, having no detrimental effect on the systems processing capacity of the target acids.

The remaining gaseous components in the scrubbers then ideally proceed through an upward flow through another aggregate bed with a counter-flowing stream of scrubbing solution which further buffers the solution.

This cycle is repeated before the scrubbed gases are released to atmosphere as vent gases. Preferably, an array of target gas sensors are located in the vent gas stream to detect the presence of any undesirable concentrations of the target gases in the vent gas.

In relation to the possible use of a desalination stage as a part of the processing of the oxidised exhaust gases, contiguous with the wet scrubbing stage, the desalination may be continuous in that the salt-laden scrubbing solution is sprayed onto a hot surface in order to evaporate off the water component of the solution, leaving the crystallised salts on the surface to be scraped off and collected in a hopper ready for disposal. The resultant steam may be collected, condensed into water and returned to the scrubbing process, together with the carbon dioxide component.

The present invention also provides an apparatus for destruction of a target gas, the apparatus including a forced-induction internal combustion engine having a combustion chamber, and a load bank, wherein:
  a) a gas compressor compresses a mixture of air and target gas at a first pressure to produce a compressed target gas mixture, and includes a target gas mixture inlet and a compressed target gas mixture outlet; and
  b) the engine destroys the target gas by combusting the compressed target gas mixture with fuel in the combustion chamber, at a combustion pressure greater than the first pressure, to produce an oxidised exhaust gas, the combustion occurring while maintaining an electrical load on the engine with the load bank, the engine also including a compressed target gas mixture inlet and an oxidised exhaust gas outlet;

the apparatus further including a processing stage to produce a vent gas from the oxidised exhaust gas for venting to atmosphere, where the vent gas includes substantially no target gas.

As mentioned above, the internal combustion engine may be any type of internal combustion engine, including intermittent combustion engines such as four-stroke and two-stroke piston engines and Wankel rotary engines, and including continuous combustion engines such as gas turbines, jet engines and many rocket engines. The engines may be fed with fossil fuels such as natural gas, petroleum products (petrol, diesel or fuel oil), or renewable fuels such as biodiesel. In a preferred form, the internal combustion engine is a diesel-cycle internal combustion engine.

In a preferred form, the load bank may be a heater capable of heating the atmosphere within a fumigated space to aid target gas desorption and speed up the degassing process, particularly in cold weather where desorption rates can be very low. In another preferred form, the gas compressor that provides forced induction to the engine is either a turbocharger or a supercharger, more preferably a turbocharger.

In a further preferred form, fixed atmospheric and target gas sensors may be provided in the gas flow before a turbocharger in order to constantly measure the respective incoming gas concentrations and relay data to measurement devices and other process control systems as necessary, including control valves and mixers for adjusting flow rates and ratios of target gas to atmospheric air. As mentioned above, this assists with ensuring optimum mix ratios are maintained with preferred operational specifications.

The mixing of the target gas and air is preferably conducted in an in-line target gas mixer and is controlled by a process control system that controls the ratio of target gas to air to form the desired target gas mixture. The target gas mixer control system will preferably also be able to monitor the concentration and composition of the incoming target gas to assist with, for example, levelling any concentration peaks that might otherwise cause a problem in the following combustion and processing stages, and/or closing off the air/target gas and engine air supply in the event of a system emergency stop brought about by the presence of explosive gases or other conditions that threaten the integrity of the process or threaten equipment damage.

In a preferred form, the (hot) oxidised exhaust gases preferably exit the engine through the oxidised exhaust gas outlet and pass into a turbocharger via a second inlet, namely an exhaust gas inlet, to drive the turbine in the turbocharger, and then exit the turbocharger at a lower temperature. The oxidised exhaust gases exiting the engine (or the turbocharger where the exhaust gases are passed through that) may be cooled by a thermostatically operated cooling fan to increase airflow over the exhaust piping, with the exhaust piping being either smooth or finned piping. Natural air convection may also be used to effect cooling of the exhaust pipe by increasing the area and number of fins attached to the exhaust piping.

Finally, it will also be appreciated that the apparatus of the present invention may be operated without a target gas moving therethrough, working just on atmospheric air, and may thus be operated in a polishing or cleansing phase as opposed to a destruction or production phase. In such a polishing phase, the processing stage of the apparatus may still operate in (where present) desalination and de-acidification modes so as to return solution in the scrubbers (remaining after a destruction phase) essentially back to water, with the gases passing through the apparatus being permitted to exhaust to atmosphere.

In one optional form, this stage of the process may also utilize ultrasonic apparatus to de-gas the scrubbing solution to further accelerate the de-acidification process by driving dissolved carbon dioxide gas out of the carbonic acid based scrubbing solution, and in doing so, more rapidly raise solution pH levels. This assists in minimising corrosion and damage within the apparatus.

BRIEF DESCRIPTION OF DRAWINGS

The present invention will now be described in relation to a preferred embodiment as presented in the schematic flow diagram of FIG. 1, and a worked example of that embodiment.

DETAILED DESCRIPTION

Illustrated in FIG. 1 is a schematic flow diagram showing a preferred embodiment of a target gas destruction method and apparatus, referred to hereafter as a Gas Destruction Unit (GDU) in accordance with the present invention. The central functions are identified broadly as follows:
Box A—target gas inlet 12, with target gas filtering
Box B—atmospheric air inlet 14, air filtering, target gas and air mixing, forced induction diesel engine
Box C—load bank, with useful heat outlet 16
Box D—scrubber system, with vent gas outlet 18 to atmosphere
Box E—optional cooling, with useful heat outlet 20
Box F—optional desalination Referring now to each of these central functions in turn, in Box A there is provided a filter assembly where target gas from, for example a fumigation chamber, enters the GDU via a flexible tube inlet 12, in this embodiment containing high volume removable filter elements to trap solids and excessive moisture.

Located in Box B with the atmospheric air inlet 14 are air and target mixing valves and fixed sensors for oxygen, explosive atmospheres, and the target gas, to constantly measure respective incoming gas concentrations and relay data to digital/analogue read outs/gauges, and in the case of the oxygen sensor, provide an electronic signal to a Process Control System (PCS) to ensure that the engine of Box B (see below) receives adequate oxygen to permit normal combustion irrespective of the oxygen levels in the target gas being sourced, which for some target gases will be quite low.

Air compensation valves (ACV) are also located on or adjacent to the engine in Box B, controlled by the PCS and actuated by the sensors described above. The valve aperture is totally closed under normal operating conditions, and will open and close proportionally in real time to adjust the air/target gas mixture to compensate for any corresponding lack of oxygen in the incoming target gas.

Further in relation to Box B in FIG. 1, the internal combustion engine in this embodiment is a diesel engine. Suitable diesel engines are of course of varying cubic capacity, which is largely dependent upon the size of fumigation chamber they will be required to evacuate, and the time allotted to do so. The diesel engine of this embodiment includes forced induction via a turbocharger that compresses the mixture of gases to a first pressure between about 16 and 18 psi, to boost the combustion temperature by increasing the amount of air in the combustion chamber available for combustion, resulting in peak flame temperatures in the order of 2,600° C. to 2,700° C. and an ultimate combustion temperature range of from 600 to 700° C. at a combustion pressure in the combustion chamber after ignition of preferably about 60 atm, operating at a constant 1500 rpm.

The chemical equations for the combustion chamber are thus:

| Compound | Main Products into Scrubber System (Box D) |
|---|---|
| Diesel Hydrocarbon + $O_2$ + Heat | $H_2O$ + $CO_2$ |
| Methyl Bromide $CH_3Br$ + $O_2$ + Hydrocarbon + Heat | $H_2O$ + $CO_2$ + HBr |

The combination of compression-related air temperature increase, and the combustion of diesel fuel, thermally decomposes/combusts the target gases in the combustion chamber of the diesel engine in a discrete combustion process that is safe to operate when dealing with atmospheres below their respective Lower Explosion Limits (LEL). The effect of pressure on the combustion of gases is such that doubling the pressure, doubles the rate of chemical reaction.

In this embodiment, the diesel engine also supplies electrical power to the load bank of Box C and other ancillary electrically powered liquid pumps (not shown) and/or heating or refrigeration units (Box E) if they are utilised. The load bank provides a load to the diesel engine, in this embodiment an electrical load, which prevents cylinder bore glazing, and raises engine combustion temperatures via the increased fuel/air mixture volumes in the cylinder/combustion chamber necessary to power the load, and is a source of heat supply 16 to, for example, facilitate gas fumigant desorption in a fumigation chamber by raising the ambient air temperature in that chamber to allow more rapid desorption of the target gas (a fumigant) from the product that has just been fumigated. The heated air is ducted from the load bank to the fumigation chamber air inlet point via fixed or flexible tubing structures from outlet 16.

In this embodiment, the load bank is an apparatus that applies a load to the engine by passing electrical energy through a series of metal resistor banks (which convert the electrical energy generated by the generator into heat during the process) all of which is preferably electronically controlled to take account of any other electrical load applied to the diesel engine, and reduce or increase resistance levels (load) to the diesel engine accordingly to ensure only the pre-programmed load is applied to the diesel engine.

The exhaust gases from the diesel engine transport the heat and waste gases from the combustion process (which includes some highly toxic by-products of the target gas) via the exhaust pipe 22 to the subsequent processing units (Box D), and specifically to the first scrubbing chamber 24 located in the scrubbing tank 26. Heat from this source is used to raise the temperature of the scrubbing solution in the scrubbing tanks to between 50° C. and 60° C. to speed up the molecules within the scrubbing solution to facilitate molecular interaction between the exhaust gases and the scrubbing solution.

In another embodiment, the exhaust gases may be exhausted from the combustion chamber through the turbocharger, which in turn drives the compressor turbine that pressurises the induction air to the diesel engine, and continues through a diverter valve that diverts the gas flow to either the scrubbing system of Box D or to atmosphere, depending upon the exhaust gas content.

In this embodiment, incoming exhaust gases for Box D are cooled to approximately 100° C. (max) just prior to entry so as to minimise the incoming air temperature to avoid excessive evaporation, but remain above the condensation point of the gases to avoid formation of potent acids in the exhaust pipe. Cooling of the exhaust can be effected by using a thermostatically operated cooling fan to increase airflow over a naked (smooth) or finned exhaust pipe (not shown). The cooled exhaust air then enters the scrubbing system of Box D and is immediately quenched (sprayed) using a water based scrubbing solution which is drawn (pumped) from a scrubbing fluid reservoir occupying the bottom section. Once again, though, it should be appreciated that pre-cooling of this type is optional and need not be utilised.

Box D includes the scrubbing chamber 24 and the scrubbing tank 26, which include a series of jets on multiple spray bars, such that the scrubbing solution cools incoming exhaust gases and initiates liquid scrubbing processes. The rapid cooling of the gas also inhibits nitric oxide and nitrogen oxide production, which are both significant global warming gases. Additionally, the scrubbing medium (water) interaction via the series of spray jets allows conversion of the exhaust gases into acids of the gaseous constituents. Other processes involved include physical contact with a calcium carbonate aggregate media to permit both phase transfer from gas to liquid (acid) and the resultant acid/base reaction to neutralize the acids and effect conversion to salts of the acid/base constituents. Heat exchange coils may or may not be installed in the tank 26 to control scrubbing liquid temperatures. A moisture trap (filter) is also located above the scrubbing tank medium to minimize the vapour loss from the tank.

Vent gas 18 exits the scrubbing system of Box D, in this embodiment with the use of an optional fan 32 in order to maintain a negative internal air throughout the scrubbing system, and also through a particulate filter (not shown). Also, fixed sensors 34 for the target gases are located in the outgoing airstream and are linked to the engine control system to stop the diesel engine instantly if a target gas reading is detected by the sensor as being outside pre-set parameters.

The optional Box E includes an external radiator bank that provides cooling energy to a heat exchanger coil located within the scrubbing fluid of the scrubbing tank 26 to maintain a constant 50° C. to 60° C. in order to prevent the scrubbing solution from boiling. As with the load bank, heat can also be ducted from either the refrigeration unit or radiator bank air outputs 20 to a fumigation chamber as described above, particularly for large scale fumigation chambers. If this extra heat source is not required, the heat is just dissipated to atmosphere.

Finally, optional Box F is a desalination unit that desalinates scrubbing fluid and returns desalinated water to the scrubbing tank 26 as well as drying and crystalizing concentrated brine into harmless salt variants of the target gas. This desalination stage is contiguous with the scrubbing stage, so there is a continuous desalination process occurring while scrubbing solution is pumped through spray nozzles. The spray nozzles (not shown) in Box F spray a salt laden solution onto a hot surface in order to evaporate off the water component of the solution, leaving the crystallised salts on the surface to be scraped off and collected in a hopper ready for disposal. In this embodiment with optional Box F, resultant steam is collected, condensed into water and returned to the scrubbing tank 26, with carbon dioxide also being diverted back into the scrubbing system.

By way of worked example, the following system was tested, giving rise to the data of Table 1.

The target gas used was 100% methyl bromide having a concentration of about 7,710 ppm (30 $g/m^3$) and a thermal decomposition temperature of 537° C. The target gas/air mixture was set to achieve an incoming target gas concentration of between 2,500 and 5,200 ppm at ambient air temperature.

The internal combustion engine was a 4 cylinder, 3.9 L, turbocharged diesel engine; the generator was rated at 415V/42 kVa/50 Hz (electronically or mechanically governed); the load bank was rated at 415V/25 kW/50 Hz with an automatic 3-stage load ramp; and the pump was a 3-stage centrifugal pump capable of delivering a flowrate of 200 LPM at 105 kPa.

With the load bank maximum load set at 75 to 80% of the generator capacity and the generator operating at 1500 rpm, the turbocharger boost pressure was in the range of 16 to 18 psi, the compression pressure was between 25 and 35 atm, the combustion chamber temperature was at 550° C., the ignition pressure was between 50 and 65 atm, and the ignition flame temperature was between 2,600 and 2,700° C.

The scrubber system was a 4-chamber, contra-flow, scrubbing tank having a water capacity of 880 L, 1.38 $m^3$ of $CaCO_3$ aggregate and a design air flowrate of 2.5 $m^3$/min. The operational pressure range was 1 to 4 kPa, the operational temperature range was 30 to 60° C., and the operational pH range was 6.3 to 6.9. The oxidised exhaust gas exiting the diesel engine was the input to the scrubber tank and contained hydrogen bromide, carbon dioxide, carbon monoxide, nitrogen oxide, nitric oxide and diesel particulate matter (DPM). The outputs from the scrubber tank were carbon dioxide, water, diesel particulate matter (DPM) and calcium bromide salt.

In relation to gas sensors, gas sampling and gas analysis, the sensors used were IR/Electrochemical sensors, 24V DC with high and low range and gas specific capability (set to sense for methyl bromide), with remote access and data logging. The gas sampling equipment was a Drager metered pump (X-act 5000) with sampling set at 10 minute intervals. Four Drager activated charcoal sample tubes were used for analysis and analysis was conducted by gas chromatograph in independent accredited laboratories. Exemplary amounts of methyl bromide detected, noting the initial methyl bromide concentration of about 30 g/m$^3$ were:

TABLE 1

| Sample ID No. | Target Gas Concentration (ppm) | Target Gas Concentration (g/m$^3$) | Target Gas Detected in Vent Gas (ppm) | % Target Gas Destroyed |
|---|---|---|---|---|
| 2 | 7710 | 30.0 | NIL | 100.0 |
| 4 | 7710 | 30.0 | NIL | 100.0 |
| 6 | 7710 | 30.0 | <1 | >99.99 |
| 7 | 7710 | 30.0 | NIL | 100.0 |

From the data of Table 1, the method and apparatus of the embodiment destroys up to 100% of the target gas by converting it into gases containing hydrogen and the base element of the chemical that was destroyed, in this worked example being bromine from methyl bromide, resulting in hydrogen bromide in the oxidised exhaust gas exiting the diesel engine.

Finally, there may be other variations and modifications made to the configurations described herein that are also within the scope of the present invention.

The claims are:

1. A method for the destruction of a non-combustible target gas, the method including:
   a) compressing at a first pressure a mixture of air and target gas to produce a compressed target gas mixture, wherein the target gas concentration in the mixture of air and target gas is kept below about 40 g/m$^3$;
   b) destroying the target gas by combusting the compressed target gas mixture with fuel in a forced-induction internal combustion engine, at a combustion pressure greater than the first pressure, to thermally decompose the target gas and produce an oxidised exhaust gas, the combustion occurring while maintaining a load on the engine with a load bank; and
   c) processing the oxidised exhaust gas to produce a vent gas for venting to atmosphere where the vent gas includes substantially no target gas.

2. A method according to claim 1, wherein the internal combustion engine is a diesel-cycle internal combustion engine and the fuel is diesel fuel.

3. A method according to claim 1, wherein the combustion occurs while maintaining an electrical load on the engine with the load bank.

4. A method according to claims 1, wherein heat generated by the load bank is used to facilitate gas fumigant desorption where the target gas is a fumigant that is being destroyed after use in a fumigation process.

5. A method according to claims 1, wherein the heat generated by the load bank is used to raise ambient air temperature in a space being fumigated to allow a more rapid desorption of the fumigant from the fumigated product.

6. A method according to claims 1, wherein the target gas is methyl bromide, phosphine or sulfuryl fluoride.

7. A method according to claim 1, including the use of a pre-filtration system prior to or after the mixing of the target gas with air.

8. A method according to claim 1, including the use of fixed atmospheric and target gas sensors before compression to constantly measure the respective incoming gas concentrations.

9. A method according to claim 1, wherein target gas is mixed with atmospheric air prior to compression in a target gas mixer controlled by a process control system that controls the ratio of target gas to air to form the desired target gas mixture.

10. A method according to claim 1, wherein the desired target gas mixture includes a minimum 3.5% oxygen content.

11. A method according to claims 1, wherein the target gas concentration in the target gas mixture is kept below about 35 g/m$^3$, or below about 30 g/m$^3$, or below about 25 g/m$^3$, or below about 20 g/m$^3$.

12. A method according to claims 1, wherein the mixture of the target gas and air is compressed to a first pressure of between about 16 psi and 18 psi.

13. A method according to claims 1, wherein the compression of the target gas mixture occurs in a turbocharger.

14. A method according to claim 13, wherein the temperature of the target gas mixture will be increased to at least 550° C. in the turbocharger.

15. A method according to claims 1, wherein the target gas mixture is compressed in the combustion chamber (prior to combustion) to a second pressure within the range of 25 to 35 atm.

16. A method according to claims 1, wherein the combustion pressure in the combustion chamber during combustion is within the range of 50 to 65 atm to produce the oxidised exhaust gas.

17. A method according to claims 1, wherein flame temperatures in the combustion chamber during combustion reach between about 2,600 to 2,700° C.

18. A method according to claims 1, wherein combustion chamber temperatures are in the range of 600 to 700° C.

19. A method according to claims 1, wherein the oxidised exhaust gases exit the engine through a turbocharger and exit the turbocharger at a lower temperature.

20. A method according to claim 19, wherein the oxidised exhaust gases exit the turbocharger at a temperature below 570° C.

21. A method according to claims 1, wherein the oxidised exhaust gases are cooled to a temperature below 100° C. prior to processing step (c).

22. A method according to claims 1, wherein the processing of the oxidised exhaust gases includes a wet scrubbing stage that utilises a plurality of water-based scrubbers, together with a cooling system designed to maintain the scrubbing solution to an optimum temperature of about 50° C. to 60° C. and a desalination stage.

23. A method for the destruction of a non-combustible target gas, the method including:
   a) continuously controlling the ratio of atmospheric air to target gas to maintain the target gas concentration in a target gas mixture below about 40 g/m3;
   b) compressing at a first pressure the target gas mixture to produce a compressed target gas mixture;

c) destroying the target gas by combusting the target gas mixture with fuel in a forced-induction internal combustion engine, at a combustion pressure greater than the first pressure, to thermally decompose the target gas and produce an oxidised exhaust gas, the combustion occurring while maintaining a load on the engine with a load bank; and d) processing the oxidised exhaust gas to produce a vent gas for venting to atmosphere where the vent gas includes substantially no target gas.

\* \* \* \* \*